Dec. 8, 1936.    A. NAGEL    2,063,331

PHOTOGRAPHIC ROLL FILM CAMERA

Filed Dec. 28, 1934

INVENTOR
August Nagel,
BY
ATTORNEYS

Patented Dec. 8, 1936

2,063,331

UNITED STATES PATENT OFFICE 2,063,331

PHOTOGRAPHIC ROLL FILM CAMERA

August Nagel, Stuttgart-Nord, Germany, assignor, by mesne assignments, to Eastman Kodak Company, Jersey City, N. J., a corporation of New Jersey Application December 28, 1934, Serial No. 759,523
In Germany January 16, 1934

10 Claims. (Cl. 242—71)

This invention relates to photographic roll film cameras and refers particularly, though not exclusively, to those of the type employing small size film such, for example, as cinematograph film and wherein, after all the exposures have been made, the film is rewound from a take-up spool onto a supply spool.

An important object of the invention is the provision in the aforementioned type of roll film camera of a control means for limiting the advancing movement of the film to one exposure area and capable of being released to permit rewinding of the film roll.

Another object of the invention is the provision of a film winding control means including a pair of members each provided with a notch and including a lost motion connection between said members, the notches in said members governing the position of a pawl which engages the take-up spool, said members being angularly spaced to disengage said pawl for advancement or rewinding of the film, but being returned to registry by said advancement of the film and permitting engagement of said pawl after one exposure area of film has been advanced through the camera.

Figure 1:
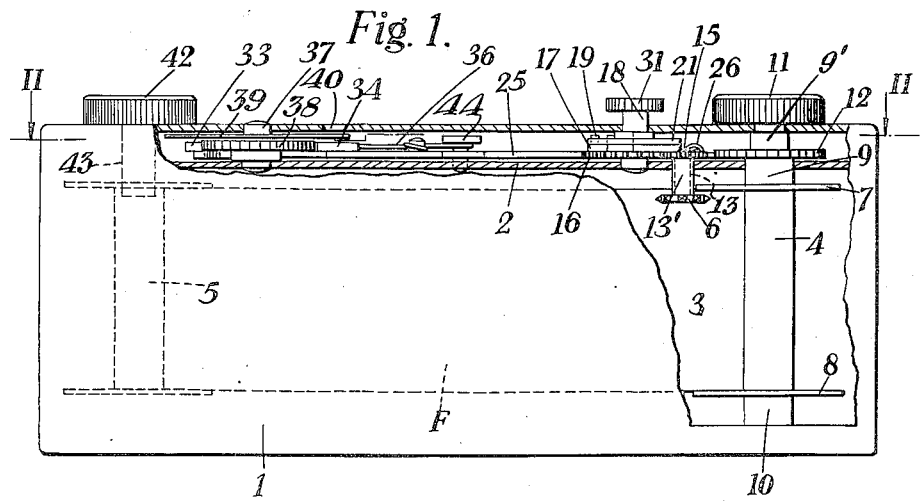
Figure 2:
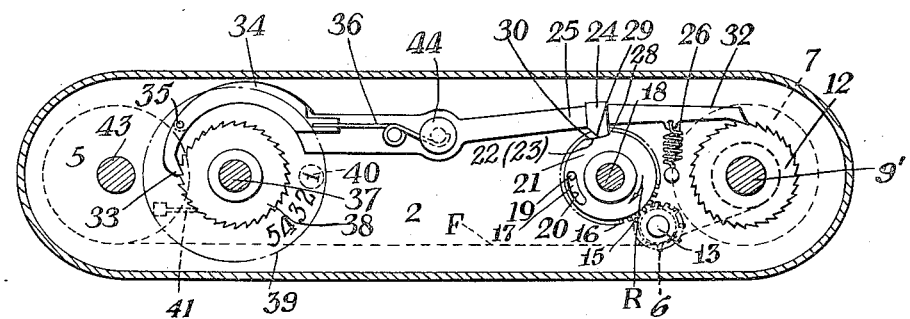
Figure 3:
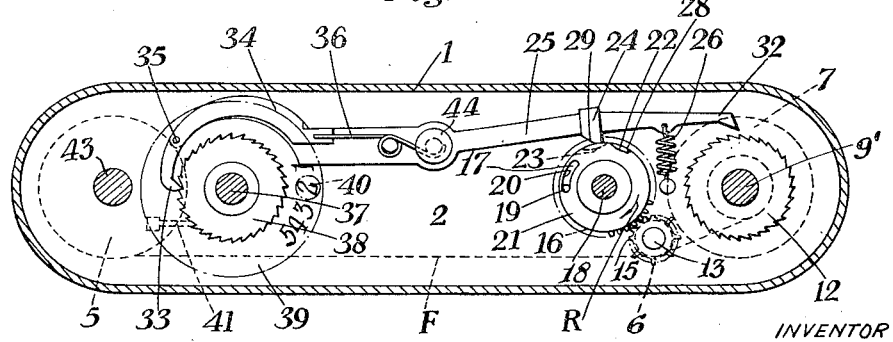

One construction according to the invention is illustrated somewhat diagrammatically and by way of example in the accompanying drawing, in which Figure 1 is a back view of the camera with parts cut away, Figure 2 is a sectional side elevation on the line II—II of Figure 1, and Figure 3 is a view similar to Figure 2 but with the parts in a different position.

In the construction illustrated the camera comprises a body 1 which is furnished with a partition 2 so as to provide two compartments, namely a small mechanism compartment for the purpose hereinafter described and a large or main compartment 3 in which is arranged the take-up spool 4 and supply spool 5 for the film F, which is of the standard width cinematograph type furnished with marginal perforations. Arranged adjacent to the take-up spool 4 is a sprocket 6 which successively engages the perforations adjacent to one margin of the film. The take-up spool 4 is permanently arranged within the camera but the supply spool 5 can be inserted into and removed from the camera in the usual way. The film can be wound from the supply spool 5 onto the take-up spool 4 and, after all the exposures have been made, the film can be rewound onto the supply spool 5 which can then be removed from the camera. For this purpose a rewinding knob 42 and a rewinding spindle 43 are provided for rotating the supply spool 5.

The take-up spool 4, which is preferably made of metal, is furnished with two flanges 7 and 8, the ends 9 and 10 of the spool being journalled in the partition 2 and one wall of the body 1 respectively. The end 9 of the spool 4 extends through the partition 2 and has a restricted portion 9' which is furnished at its outer end with a knob 11 lying outside the camera. A ratchet wheel 12 is secured to the end 9 of the core so as to lie in the mechanism chamber formed between the partition 2 and the adjacent side wall of the camera.

The sprocket 6 is rigidly secured to a shaft 13 which can rotate within a short sleeve 13' carried on the inner surface of the partition 2, the outer end of the shaft 13 carrying a pinion 15 which engages a gear wheel 16 comprising part of a rotary control device for controlling locking mechanism hereinafter described. The gear wheel 16, which is rigidly secured to a disc 17, is mounted to rotate on a shaft 18 journalled in the partition 2 and in the adjacent side wall of the camera. The disc 17 carries a pin 19 which extends through an arcuate slot 20 (Figures 2 and 3) formed in a second disc 21 which is secured to the shaft 18. A control knob 31 is secured to the outer end of shaft 18.

The disc 21 is furnished with a notch 22 and the disc 17 with a notch 23, these notches cooperating, as hereinafter described, with a projection 24 carried by a locking lever 25 which is pivoted on partition 2 by a stud 44. A spring 26 biases the lever 25 so that the projection 24 is urged towards the edges of the discs 17 and 21. The projection 24 is bevelled on one side as indicated at 29, and each of the notches 22, 23 has a chamfered face 30 at one side but is formed into a relatively sharp nose 28 at the other side.

One end of the lever 25 is furnished with a nose 32 for cooperation with the ratchet wheel 12 whilst the opposite end of the lever 25 carries a pawl 34 pivoted at 35 on the lever 25, a spring 36 tending to urge the free end 33 of the pawl 34 into engagement with a ratchet wheel 38 mounted on a shaft 37. The shaft 37 is secured to a counting disc 39 bearing a series of numbers which are brought successively opposite an opening 40 in the adjacent wall of the camera. A leaf spring 41 cooperates with the ratchet wheel 38 so as to prevent reverse rotation of the counting disc 39.

The operation of the mechanism is as follows:

After the supply spool 5 bearing the virgin film has been placed in the camera and the end of the film secured to the take-up spool 4, the parts are in the position shown in Figure 3. That is to say the projection 24 on the lever 25 rides on the edges of the discs 17 and 21 and the nose 32 of the lever 25 is thus held out of engagement with the ratchet 12. As the film is wound on to the take-up spool 4, the movement of the film causes rotation of the sprocket wheel 6 so that the gear wheel 15 rotates the gear wheel 16 and therefore the disc 17, first moves the pin 19 from the position shown in Figure 3 to the opposite end of the slot 20 whereby the notches 22 and 23 are brought into register. The disc 17 now commences to transmit movement through the pin 19 to the disc 21, the projection 24 riding on the circumferential edges of the discs 21 and 17. When a length of film corresponding to one exposure area has been taken up the projection 24 drops over the noses 28 of the discs 17 and 21 so as to lie simultaneously in the notches 22 and 23. As the projection 24 moves into these notches, the spring 26 moves the lever 25 so that its nose 32 engages the ratchet wheel 12 and thus locks the take-up mechanism against further taking-up of the film. This clockwise movement of the lever 25 causes the pawl 33 to move around the teeth of the ratchet wheel 38 in the clockwise direction, rotation of the ratchet wheel 38, and therefore of the counting disc 39, in the clockwise direction being prevented by the leaf spring 41. Since the nose 32 of the lever 25 now locks the winding key against further rotation in the taking-up direction, the length of film extending between the take-up spool 4 and the sprocket 6 cannot be subjected to tension and therefore strain.

The parts are now in the position shown in Figure 2 and, after the exposure has been made and it is desired to take up the length of film corresponding to one exposure area so as to prepare for the succeeding exposure, the locking mechanism can be released by rotating a knob 31 outside the camera and secured to the outer end of the shaft 18. By rotating the knob 31 in the counterclockwise direction the disc 21, which is secured to the shaft 18, rotates in the direction of the arrow R but does not transmit movement to the disc 17 since the pin 19 slides in the arcuate slot 20. As the disc 21 rotates in the direction of the arrow relatively to the disc 17, the projection 24 rides up the chamfered face 30 of the notch 22 in the disc 21, whereby the lever 25 is turned about its stud 44 in the counterclockwise direction and is thus raised into the position shown in Figure 3, the nose 32 thus being moved out of engagement with the ratchet 12, and the notches 22 and 23 being out of register. The take-up mechanism is thus released in readiness for taking up the film. The counterclockwise movement of the lever 25 causes the end 33 of the pawl 34 to engage the ratchet wheel 38 and turn this ratchet wheel, as also the counting disc 39, in the counterclockwise direction, thereby advancing the counting mechanism to indicate the next exposure number. The parts are now in the position shown in Figure 3 and the film can be taken up by means of the winding key 11. During the first part of this taking-up movement the disc 17 rotates relatively to the disc 21 since the pin 19 slides along the slot 20 in the clockwise direction until the pin 19 engages the opposite end of the slot 20 from that shown in Figure 3, whereupon the notches 22 and 23 again lie in register and the projection 24 rides on the edges of the two discs, the above operation being repeated.

When the last exposure has been made the locking mechanism is released so that the parts lie in the position shown in Figure 3. The notches 22 and 23 are not now in register so that as the film is rewound on to the supply spool 5 the discs 17 and 21 will rotate in the counterclockwise direction without the projection engaging either of the notches 22 or 23.

It will therefore be seen that after a length of film corresponding to one exposure area has been taken up, the take-up mechanism is automatically locked until released by the operator, this releasing operation advancing the counting mechanism by one step. Further, since the disc 17, which is directly driven from the sprocket 6, is connected to the disc 21 on the shaft 18 through the lost motion device constituted by the pin 19 and slot 20, the releasing movement effected by means of the knob 31 is not transmitted back through the sprocket 6 to the film F.

It will be understood that the construction above described is given by way of example only and that details may be modified.

What I claim as my invention and desire to secure by Letters Patent is:—

1. In a photographic camera, the combination with a casing provided with a supply chamber which is adapted to receive a supply spool having a film wound thereon and provided with a take-up chamber which is adapted to receive a take-up spool, a film take-up mechanism associated with the take-up spool, and locking mechanism for engaging said take-up mechanism to prevent movement thereof, of a control means including a pair of members for maintaining said locking mechanism out of engagement, each member being provided with a portion for registering with the portion on the other member and permitting engagement of said take-up mechanism by said locking mechanism, a driving means connected to one of said members and adapted to be driven by movement of the film between said supply and take-up spools, and a connection between said members for moving said portions into registry when the film is moved in one direction and permitting a limited relative displacement between said members and said portions upon movement of the film in the opposite direction.

2. In a photographic camera, the combination with a casing provided with a supply chamber which is adapted to receive a supply spool having a film wound thereon and provided with a take-up chamber which is adapted to receive a take-up spool, a film take-up mechanism associated with the take-up spool, and locking mechanism for engaging said take-up mechanism to prevent movement thereof, of a control means including a pair of members for maintaining said locking mechanism out of engagement, each member being provided with a portion for registering with the portion on the other member and permitting engagement of said take-up mechanism by said locking mechanism, and a loose connection between said members to permit relative displacement of the portions on said members for disengagement of said locking mechanism.

3. In a photographic camera, the combination with a casing provided with a supply chamber which is adapted to receive a supply spool having a film wound thereon and provided with a take-up chamber which is adapted to receive a take-up spool, a film take-up mechanism associated with the take-up spool, and locking mechanism for engaging said take-up mechanism to prevent movement thereof, of a control means including a pair of members for maintaining said locking mechanism out of engagement, each member being provided with a portion for registering with the portion on the other member and permitting engagement of said take-up mechanism by said locking mechanism, means for transmitting the movement of the film to one of said members, and a loose connection between said members arranged to bring the portions of said members into registry upon advancement of the film.

4. In a photographic camera, the combination with a casing provided with a supply chamber which is adapted to receive a supply spool having a film wound thereon and provided with a take-up spool, a film take-up mechanism associated with the take-up spool, and locking mechanism for engaging said take-up mechanism to prevent movement thereof, of a control means including a pair of members for maintaining said locking mechanism out of engagement, each member being provided with a portion for registering with the portion on the other member and permitting engagement of said take-up mechanism by said locking mechanism, means for transmitting the movement of the film to one of said members, and a loose connection between said members arranged to relatively displace the portions of said members upon rewinding or retrograde movement of the film.

5. In a photographic roll film camera, in combination, a casing, a supply chamber in the casing and adapted to receive a supply spool having a film wound thereon, a take-up chamber within the casing and adapted to receive a take-up spool, locking mechanism for the said take-up mechanism and comprising a lever and a rotary device which controls the lever and comprises two discs mounted coaxially side by side and each having a notch in its edge, means whereby one disc is driven by movement of the film, means whereby the second disc can be rotated from outside the casing, a lost motion device coupling the two discs together and which permits such limited relative rotation of the discs as will bring the notches in the discs into or out of registration, and a part carried by the locking lever and bearing on the edges of the discs and which will enter the said notches when they are in register and allow the lever to move and engage and lock the take-up mechanism, subsequent rotation of the second disc from outside the camera moving that disc relatively to the first disc thereby moving the lever and releasing the take-up mechanism.

6. In a photographic roll film camera, in combination, a casing, a supply chamber in the casing and adapted to receive a supply spool having a film wound thereon, a take-up chamber within the casing and adapted to receive a take-up spool, locking mechanism for the said take-up mechanism and including a lever and a rotary device which controls the lever and comprises two discs mounted coaxially side by side and each having a notch in its edge, means whereby one disc is driven by movement of the film, means whereby the second disc can be rotated from outside the casing, a lost motion device coupling the two discs together and which permits such limited relative rotation of the discs as will bring the notches in the discs into or out of registration, and a part carried by the locking lever and bearing on the edges of the discs and which will enter the said notches when they are in register and allow the lever to move and engage and lock the take-up mechanism, subsequent rotation of the second disc from outside the camera moving that disc relatively to the first disc thereby moving the lever and releasing the take-up mechanism when the notches will remain out of register and the locking mechanism maintained inoperative during rewinding of the film on to the supply spool.

7. In a photographic roll film camera, in combination, a casing, a supply chamber in the casing and adapted to receive a supply spool having a film wound thereon, a take-up chamber within the casing and adapted to receive a take-up spool, locking mechanism for the said take-up mechanism and including a lever and a rotary device which controls the lever and comprises two discs mounted coaxially side by side and each having a notch in its edge, means whereby one disc is driven by movement of the film, means whereby the second disc can be rotated from outside the casing, a lost motion device coupling the two discs together and which permits such limited relative rotation of the discs as will bring the notches in the discs into or out of registration, and a part carried by the locking lever and bearing on the edges of the discs and which will enter the said notches when they are in register and allow the lever to move and engage and lock the take-up mechanism, subsequent rotation of the second disc from outside the camera moving that disc relatively to the first disc thereby moving the lever and releasing the take-up mechanism, and exposure counting mechanism operated by the locking lever as this moves to release the take-up mechanism.

8. In a photographic roll film camera, in combination, a casing, a supply chamber in the casing and adapted to receive a supply spool having a film wound thereon, a take-up chamber within the casing and adapted to receive a take-up spool, locking mechanism for the said take-up mechanism and including a lever and a rotary device which controls the lever and comprises two discs mounted coaxially side by side and each having a notch in its edge, sprocket engaging perforations in the film and driving one of said discs, an operating member outside the camera whereby the second disc can be manually rotated, a lost motion device coupling the two discs together and which permits such limited relative rotation of the discs as will bring the notches in the discs into or out of registration, and a part carried by the locking lever and bearing on the edges of the discs and which will enter the said notches when they are in register and allow the lever to move and engage and lock the take-up mechanism, subsequent rotation of the second disc from outside the camera moving that disc relatively to the first disc thereby moving the lever and releasing the take-up mechanism.

9. In a photographic roll film camera, in combination, a casing, a supply chamber in the casing and adapted to receive a supply spool having a film wound thereon, a take-up chamber within the casing and adapted to receive a take-up spool, locking mechanism for the said take-up mechanism and including a lever and a rotary device which controls the lever and comprises two discs mounted coaxially side by side and each having a notch in its edge, sprocket engaging perforations in the film and driving one of said discs, an operating member outside the camera whereby the second disc can be manually rotated, a lost motion device coupling the two discs together and which permits such limited relative rotation of the discs as will bring the notches in the discs into or out of registration, a part carried by the locking lever and bearing on the edges of the discs and which will enter the said notches when they are in register and allow the lever to move and engage and lock the take-up mechanism, subsequent rotation of the second disc from outside the camera moving that disc relatively to the first disc thereby moving the lever and releasing the take-up mechanism, and exposure counting mechanism operated by the locking lever as this moves to release the take-up mechanism.

10. In a photographic roll film camera, in combination, a casing, a supply chamber in the casing and adapted to receive a supply spool having a film wound thereon, a take-up chamber within the casing and adapted to receive a take-up spool, locking mechanism for the said take-up mechanism and including a lever and a rotary device which controls the lever and comprises two discs mounted coaxially side by said and each having a notch in its edge, means whereby one disc is driven by movement of the film, means whereby the second disc can be rotated from outside the casing, a lost motion device coupling the two discs together and comprising a projection carried by one disc and freely engaging a slot in the other disc thereby permitting such limited relative rotation of the discs as will bring the notches in the discs into or out of registration, and a part carried by the locking lever and bearing on the edges of the discs and which will enter the said notches when they are in register and allow the lever to move and engage and lock the take-up mechanism, subsequent rotation of the second disc from outside the camera moving that disc relatively to the first disc thereby moving the lever and releasing the take-up mechanism.

AUGUST NAGEL.